(12) United States Patent
Yeomans et al.

(10) Patent No.: US 11,890,510 B2
(45) Date of Patent: Feb. 6, 2024

(54) OPTIMIZED SPORTS ARTICLE

(71) Applicant: adidas AG, Herzogenaurach (DE)

(72) Inventors: Deborah June Yeomans, Herzogenaurach (DE); Iain James Sabberton, Cambridge (GB); Simon Peter Wilsher, Letchworth (GB); Keir Samuel Jackson, Cumbria (GB); Oliver Nathaniel Ambrose Price, London (GB); Marco Albert Dittrich, Adelsdorf (DE); Henry Hanson, Herzogenaurach (DE); Alain Walter, Herzogenaurach (DE); Jochen Suessmuth, Erlangen (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 17/661,871

(22) Filed: May 3, 2022

(65) Prior Publication Data

US 2022/0258011 A1 Aug. 18, 2022

Related U.S. Application Data (62) Division of application No. 16/439,611, filed on Jun. 12, 2019, now Pat. No. 11,351,422.

(30) Foreign Application Priority Data

Jun. 14, 2018 (DE) ...................... 10 2018 209 565.5

(51) Int. Cl.
*G06T 19/20* (2011.01)
*A63B 33/00* (2006.01)
(Continued)

(52) U.S. Cl.
CPC ................ *A63B 33/00* (2013.01); *A42C 1/00* (2013.01); *G06T 17/00* (2013.01); *G06T 19/20* (2013.01); *G06T 2200/08* (2013.01)

(58) Field of Classification Search
None
See application file for complete search history.

(56) References Cited

U.S. PATENT DOCUMENTS

| 1,771,178 A | 7/1930 | Howland |
| 2004/0261153 A1 * | 12/2004 | Johnson ................... A42B 1/12 2/68 |

(Continued)

FOREIGN PATENT DOCUMENTS

| CN | 101204251 A | 6/2008 |
| CN | 106235486 A | 12/2016 |

(Continued)

OTHER PUBLICATIONS

Extended European Search Report issued in European Patent Application No. 19179727.3, dated Oct. 31, 2019, 8 pages.
(Continued)

*Primary Examiner* — Yanna Wu
(74) *Attorney, Agent, or Firm* — Sterne, Kessler, Goldstein & Fox P.L.L.C.

(57) ABSTRACT

A swimming cap including a main body including a first thickness; a rim portion, arranged around a rim of the swimming cap, including a second thickness; two overhang portions configured to be arranged symmetrically on either side of a spine of a wearer; and a recess configured to be arranged in proximity to the spine.

17 Claims, 5 Drawing Sheets

(51) Int. Cl.
A42C 1/00 (2006.01)
G06T 17/00 (2006.01)

(56) References Cited

U.S. PATENT DOCUMENTS

| | | | |
|---|---|---|---|
| 2007/0032989 A1 | 2/2007 | Hodges et al. | |
| 2010/0192273 A1* | 8/2010 | Dodd | A42B 1/12 2/68 |
| 2012/0053548 A1 | 3/2012 | Ashton et al. | |
| 2016/0066639 A1 | 3/2016 | Brown | |
| 2016/0155186 A1 | 6/2016 | Su et al. | |
| 2017/0065022 A1 | 3/2017 | Smith | |
| 2017/0068774 A1 | 3/2017 | Cluckers et al. | |
| 2019/0232114 A1* | 8/2019 | Burns | A42B 1/08 |
| 2020/0066029 A1 | 2/2020 | Chen et al. | |

FOREIGN PATENT DOCUMENTS

| | | |
|---|---|---|
| CN | 106263211 A | 1/2017 |
| DE | 549715 C | 4/1932 |
| WO | 2001/39051 A2 | 5/2001 |
| WO | 2010/088459 A2 | 8/2010 |

OTHER PUBLICATIONS

Office Action directed to related Chinese Patent Application No. 201910504547.8, dated Aug. 26, 2023.
Office Action directed to related Chinese Patent Application No. 201910504547.8, dated Nov. 17, 2023.

\* cited by examiner

OPTIMIZED SPORTS ARTICLE

CROSS-REFERENCE TO RELATED APPLICATIONS

This application is a divisional of U.S. patent application Ser. No. 16/439,611, filed Jun. 12, 2019, and claims priority to DE Patent Application No. 10 2018 209 565.5, filed Jun. 14, 2018, each of which is incorporated herein by reference in its entirety for all purposes.

FIELD OF THE INVENTION

The present invention relates to optimized methods of designing and producing a sports article, especially a swimming cap.

BACKGROUND OF THE INVENTION

An accurate fit of a sports article, in particular sports apparel or footwear, is particularly important as it may strongly affect the performance of an athlete. For example, a sports shoe that does not fit properly would not allow an athlete to make the most of their ability.

A poor fit may also lead to an increased drag. This is particularly important for sports apparel, for example a swimming cap. Many swimming caps wrinkle or bulge at the top, which increases the drag during a race or training and thus may hinder a top performance. Moreover, swimming caps as known in the art sometimes flick up around the ears or move around on a wearer's head. This is a particular problem for athletes with long hair, where the fit is frequently poor. In practice, many athletes wear two caps rather than just one to overcome some of these problems. However, this is an inconvenience for the athlete, which adds unnecessary weight and may increase the drag experienced during swimming. Another common problem experienced by many athletes is that swimming caps tend to exert an upwards pull on the skin of a wearer, leading to discomfort and often forcing an athlete to readjust the position of the swimming cap.

WO 2010/088459 A2 relates to a swim cap, which includes a shell forming a concave region terminating at a circumferential rim, and a resilient margin secured to the shell along the circumferential rim.

WO 1/39051 A2 relates to a method for selecting a product and adapting a product to the measurements of a consumer by detecting the measurements of said consumer by means of a scanner. Pre-produced products are fitted by measuring the real human body by means of a three-dimensional (3D) scanning and processing the detected data for producing a virtual body.

However, the methods known in the art for improving the fit of sports article are insufficient to overcome the problems outlined above.

It is therefore an object of embodiments of the present invention to provide a method of designing a sports article that allows an improved fit compared with methods known in the art. It is a further object of embodiments of the present invention to provide a swimming cap with an improved fit, that is comfortable to wear, avoids or reduces wrinkles at the top, and stays in position even during sudden movements such as a tumble turn.

BRIEF SUMMARY OF THE INVENTION

The first object is accomplished by the teachings of claim 1, in particular by a method of designing a sports article, comprising:

(a) scanning at least one body part of at least a first person;
(b) creating a first digital model of the body part of the first person;
(c) creating a digital model of the sports article;
(d) digitally arranging the digital model of the sports article on the first digital model of the body part, while allowing the digital model of the sports article to stretch digitally; and
(e) digitally modifying at least one property of the digital model of the sports article based on the first digital model of the body part and the digital model of the sports article.

The inventors have realised that it is not only the size and measures of a sports article that determine its fit, but also its stretch. This is true in particular for sports articles that require a tight fit to reduce the drag in water or their air resistance, for example, a swimming cap, a running shirt, running shorts, cycling outfit, etc. Therefore, an important aspect of embodiments of the present invention is to allow the digital model of the sports article to stretch digitally. This may optionally take into account certain material properties of the sports article, such as its elasticity. For example, if a circumference of the body part is $C_B$ and an unstretched corresponding circumference of the sports article is $C_S$, then allowing the sports article to stretch digitally may comprise scaling the corresponding circumference of the sports article by a factor of $C_B/C_S$.

This method may be used to produce a customised sports article for an individual customer, or the method may be used to produce a sports article in large quantities based on the first digital model of the body part of the first person. It is important to understand that the size and shape of the body part may vary from person to person and therefore the digital model, once modified, may have a custom shape that varies from person to person. However, the methods described herein allow an optimal fit to be achieved for many sizes and shapes of the body part.

The method may further comprise: scanning the body part of a second person; creating a second digital model of the body part of the second person; creating an average digital model of the body part based on an average of the first digital model and the second digital model; digitally arranging the digital model of the sports article on the average digital model of the body part, allowing the digital model of the sports article to stretch digitally, wherein digitally modifying the property of the digital model of the sports article is based on the average digital model of the body part and the digital model of the sports article.

Therefore, the method of designing a sports article, may comprise: (a1) scanning at least one body part of at least a first person; (a2) scanning the body part of a second person; (b1) creating a first digital model of the body part of the first person; (b2) creating a second digital model of the body part of the second person; (c) creating an average digital model of the body part based on an average of the first digital model and the second digital model; (d) creating a digital model of the sports article; (e) digitally arranging the digital model of the sports article on the average digital model of the body part, allowing the digital model of the sports article to stretch digitally; and (f) digitally modifying at least one property of the digital model of the sports article based on the average digital model of the body part and the digital model of the sports article.

In other words, rather than using just a first digital model of a body part of the first person, an average of the first digital model of the body part of the first person and the second digital model of the body part of the second person is used. It is possible that the body part of three or more persons, for example a plurality of persons, is scanned and the corresponding digital models are used for creating an average digital model. It is to be understood that the same body part is scanned in any case, e.g. if a right hand is scanned for a first person, the right hand of a second, third, fourth person etc. is scanned. This way it is possible to create an accurate digital model of the body part that allows designing a sports article that fits well for a group of people, for example for a group of swimming athletes.

For example, in order to provide an optimal fit of the swimming cap for a group of swimmers, it is advantageous to understand the geometry of the swimmers' heads. This can be achieved by creating an average digital model of the head, which comprises scanning the head of multiple swimmers and performing a statistical analysis of the head scans. One exemplary way to perform this is by a non-rigid registration process, which digitally applies a common template mesh to all head scan instances and by obtaining a set of meshes corresponding to the multiple head scans. Each mesh of the set of meshes has the same topology and number of vertices but with a different geometry and shape corresponding to the respective original scan. The set of meshes then allows to directly and easily compare the head scans and to perform statistical operations such as computation of averages or standard deviations. An average model of the multiple head scans can thus be generated. Alternatively, any suitable method for generating a 3D geometry may be used here.

Scanning at least one body part may comprise using optical means, for example a camera, a stereo-camera system, a structured light scanning, or laser scanning, in order to create a three-dimensional digital model of the at least one body part. One example is using ARTEC 3D EVA.

Scanning at least one body part may comprise providing at least two cameras to obtain a three-dimensional image of the body part. By using two cameras, arranged at different positions, it is possible to construct a three-dimensional image of the body part without having to move the body part. It may be difficult to control accurately while moving the body part, for example there may be a certain degree of translation, even if only rotation is required for a certain image sequence. Therefore, by using at least two cameras, arranged at different positions, it is possible to construct a more accurate three-dimensional image of the body part.

Alternatively, a three-dimensional image of the body part may be obtained using only one camera with designed image processing tools and/or additional information from supplementary motion sensors such as accelerometers on a portable electronic device.

The body part may be a head and the sports article may be a swimming cap. Swimming caps known in the art tend to wrinkle or bulge at the top. This increases the drag experienced by an athlete and may hinder a top performance. Therefore, the method according to embodiments of the present invention is particularly advantageous if the body part is a head and the sports article is a swimming cap.

The property of the digital model of the sports article may comprise a circumference of the sports article; and wherein digitally modifying the circumference comprises: digitally modifying the circumference such that, when digitally arranging the digital model of the sports article on the first digital model of the body part or the average digital model of the body part, the circumference of a first portion of the digital model of the sports article stretches by a first fraction and the circumference of a second portion of the digital model of the sports article stretches by a second fraction. It is to be understood that digitally modifying the circumference means, digitally modifying the unstretched circumference, i.e. digitally modifying is not the same as digitally stretching since in the latter case the circumference would increase but the unstretched circumference would not increase. Unstretched means, that no force is deliberately applied to stretch the circumference.

An important insight of the inventors is that the fit can be improved significantly, if the circumference of a first portion of the sports article stretches by a first fraction and the circumference of a second portion of the sports article stretches by a second fraction. In other words, there are differences between the first portion and the second portion in the tightness of the fit of the sports article.

The first portion may be a top portion and the second portion may be a bottom portion of the sports article and the first fraction may be smaller than the second fraction. In other words, the sports article may have a tighter fit in a bottom portion than in a top portion. In the present context, a top portion is arranged closer to an apex of the sports article, e.g. the swimming cap, than a bottom portion. The inventors have found, that this arrangement improves the fit of the sports article and for example reduces the formation of wrinkles and bulges at the top of a swimming cap.

The first fraction may be between 0% and 10% and the second fraction may be between 20% and 50%, preferably between 25% and 35%. The inventors have found that a large second fraction, i.e. a large stretch, improves the fit of the sports article and for example reduces the formation of wrinkles and bulges at the top of a swimming cap. However, if the second fraction is too large, the sports article becomes uncomfortable to wear. Moreover, the first fraction is preferably relatively small, in order to improve the fit of the sports article. It is to be understood that if the first fraction is, for example, 30%, the stretched circumference of the first portion is 1.3 times the unstretched circumference of the first portion of the digital model of the sports article.

The property of the digital model of the sport articles may comprise a shape of the sports article. The shape of the sports article crucially determines its fit. The method according to embodiments of the present invention is ideally suited for digitally modifying the shape of the digital model of the sports article based on the digital model of the body part and the digital model of the sports article. Therefore, an improved fit of the sports article may be achieved.

For example, the sports article may be a swimming cap and modifying the shape of the digital model of the swimming cap may comprise, creating two overhang portions arranged symmetrically on either side of a spine of a wearer and a recess arranged in proximity to the spine. An overhang portion, in the present context, is any portion of the swimming cap that protrudes from a surrounding edge of the swimming cap. A recess, in the present context is an analogous indentation from the surrounding edge of the swimming cap.

A surrounding edge is an imaginary edge of the swimming cap defined by an edge in a forehead portion of the swimming cap and extended around the entire circumference of the swimming cap. A geometrically-equivalent definition of an overhang portion and a recess can be made in respect of a plane defined by three distinct non-collinear points on an edge of the swimming cap in a forehead portion of the swimming cap. The plane defines a reference with respect to which the overhang portions protrude and with respect to which the recess represents an indentation.

In other words, an overhang portion protrudes with respect to a surrounding edge and a recess represents an indentation with respect to the surrounding edge, wherein the surrounding edge is an imaginary edge of the swimming cap defined by an edge of a forehead portion of the swimming cap and extended around the entire circumference of the swimming cap.

Or equivalently, an overhang portion protrudes with respect to a plane and a recess represents an indentation with respect to the plane, wherein the plane is defined by three distinct non-collinear points on an edge of the swimming cap in a forehead portion of the swimming cap.

The inventors have found that two overhang portions arranged symmetrically on either side of a spine of a wearer and a recess arranged in proximity to the spine may improve the stability of the swimming cap on the head of an athlete.

The overhang portions may protrude from a surrounding edge, or equivalently the plane defined above, of the swimming cap by at least 1 cm and the recess may represent an indentation from the surrounding edge, or equivalently the plane defined above, by at least 1 cm. This way, the stability of the fit of the swimming cap on the head of an athlete may be improved.

The digital model of the sports article and/or the first digital model of the body part and/or the average digital model of the body part may further comprise at least one material property of the sports article and/or the body part. A material property in the present context is any property of a material of the sports article and/or the body part apart from geometric properties such as a thickness, length, circumference, etc. It is to be understood that the property may also comprise geometric properties such as a thickness, length, circumference, etc.

By including at least one material property of the sports article and/or the body part in the corresponding digital model, it is possible to further improve the fit and comfort of the sports article.

The at least one material property may comprise an elastic modulus of the sports article.

The method may further comprise calculating at least one force on the basis of the first digital model of the body part or the average digital model of the body part and the digital model of the sports article, and wherein digitally modifying at least one property of the digital model of the sports article may be at least partially based on the calculated force.

For a given stretch, the force exerted by the sports article on the body part depends on the elastic modulus of the sports article. Therefore, to design a sports article with a comfortable fit, it is advantageous to include an elastic modulus of the sports article in the digital model.

The force may be an upwards-pulling shear force, or a vertical shear force more generally, and digitally modifying at least one property of the digital model of the sports article may comprise reducing the upwards-pulling shear force, or the vertical shear force. The inventors have found, that a vertical shear force, e.g. an upwards-pulling shear force, is uncomfortable for the athlete as it pulls on the skin, for example the skin on the forehead of the athlete, or on the athlete's hair. Moreover, an upwards-pulling shear force may lead to a poor fit, especially during dynamic movement, such that the swimming cap may consequently slide upwards on the head of the athlete.

It is therefore advantageous to reduce the vertical shear force, e.g. the upwards-pulling shear force as achieved by the sports article and the method of embodiments of the present invention.

The force may be calculated on the basis of a finite-element analysis. A finite-element analysis is any method that subdivides a space into a number of finite elements in order to solve an underlying set of equations, for example an underlying set of partial differential equations. Each element is assigned certain properties e.g. an elastic modulus. Numerous types of finite-element analysis are suitable.

Digitally modifying at least one property of the digital model of the sports article may comprise digitally modifying a thickness of the sports article.

The thickness is an important parameter for determining the fit and stability of the sports article. For example, the inventors have found that a swimming cap with a uniform thickness leads to a large vertical shear force and in particular an upwards-pulling shear force. The swimming cap will thus tend to "pull itself off the head" of the athlete. The upwards-pulling shear force can be reduced by a swimming cap comprising: a main body comprising a first thickness; and a rim portion, arranged around a rim of the swimming cap, comprising a second thickness; wherein the first thickness is smaller than the second thickness.

Embodiments of the invention further concerns a method of producing a sports article comprising:
(a) creating a design of a sports article by any method described herein; and (b) producing the sports article according to the design. Thus, a sports article with an improved fit may be obtained.

Producing the sports article may comprise injection molding or slush molding the sports article. Injection molding and slush molding are simple and efficient ways of producing large quantities of a sports article.

Embodiments of the invention further concerns a swimming cap comprising: a main body comprising a first thickness; a rim portion, arranged around a rim of the swimming cap, comprising a second thickness; and two overhang portions (19) arranged symmetrically on either side of a spine of a wearer and a recess (20) arranged in proximity to the spine. The terms overhang portion and recess have already been defined herein.

The inventors have found that two overhang portions arranged symmetrically on either side of a spine of a wearer and a recess arranged in proximity to the spine may improve the stability of the swimming cap on the head of an athlete and reduce a vertical shear force and in particular an upwards-pulling shear force on the cap. Therefore, the swimming cap according to embodiments of the present invention provides a better and more comfortable fit than swimming caps known in the art.

The first thickness may be different from the second thickness. However, the first and the second thickness may also be identical.

The first thickness may be smaller than the second thickness. The inventors have found that a swimming cap with a uniform thickness may lead to a large vertical shear force and in particular an upwards-pulling shear force. The swimming cap may tend to "pull itself off the head" of the athlete. The vertical shear force, in particular the upwards-pulling shear force can be reduced further by a swimming cap comprising: a main body comprising a first thickness; and a rim portion, arranged around a rim of the swimming cap, comprising a second thickness; wherein the first thickness is smaller than the second thickness.

The first thickness may be between 0.2 and 0.6 mm, preferably between 0.3 and 0.5 mm. The smaller the first thickness, the smaller is a vertical shear force, especially an upwards-pulling shear force. However, the first thickness cannot be too small for two reasons. First, the swimming cap needs to have a certain minimum first thickness to ensure sufficient stability. Secondly, for a small first thickness, the hair of an athlete creates indentations on the outside of the swimming cap, which may lead to turbulence during swimming and increase the drag experienced by the athlete. The inventors have found, that the given range provides a preferable balance between these factors, allowing an ideal fit, good stability, and low drag.

The second thickness may be between 1.5 and 2.5 mm, preferably between 1.5 and 2 mm. The greater the second thickness, the lower is a vertical shear force and especially an upwards-pulling shear force. However, if the second thickness is too large, the drag experienced by an athlete is increased.

The main body may comprise a first material and the rim portion may also comprise the first material. The swimming cap may be formed from essentially a single material. "Essentially" means in this context regardless of fluctuations and manufacturing imperfections, for example due to impurities. This allows for a particularly simple construction, for example by injection molding or slush molding, of the swimming cap.

A width of the rim portion may vary around the rim between 10 mm and 30 mm. The inventors have found that the variation in the width of the rim portion may further improve the balance between good fit and low drag. For example, the rim portion may have a smaller width in a front portion than in a rear portion. A front portion, in the present context, is a portion of the swimming cap that is arranged on the forehead of an athlete during normal use. This way, the drag from the rim portion may be reduced in a front portion, which is particularly important for determining the drag, while a wider rim portion in a rear portion may improve the fit of the swimming cap.

The main body and/or the rim portion may comprise a shore A hardness of between 20 and 60, preferably between 20 and 50, most preferably between 20 and 40. The inventors have found that a greater hardness reduces the depth or height of indentations caused by the athlete's hair on the outside of the swimming cap. This improves the drag experienced by the athlete. However, if the swimming cap is too hard, it is experienced as uncomfortable by an athlete. A good balance between these two factors is achieved in the hardness range specified above.

The surface of the main body and/or the rim portion may comprise a texture. The inventors have found, that a textured surface may lower the drag experienced by an athlete wearing the swimming cap.

The overhang portions may protrude from a surrounding edge, or equivalently the plane defined herein, of the swimming cap by at least 1 cm and the recess may represent an indentation from the surrounding edge, or equivalently the plane defined herein, by at least 1 cm. This way, the stability of the fit of the swimming cap on the head of an athlete may be improved.

The swimming cap may comprise neoprene, latex, and/or silicone. These materials are durable and comfortable to wear. Neoprene, latex and/or silicone, also known as polysiloxane, allow the hair of the athlete to be kept dry since they are essentially waterproof. Essentially waterproof is to be understood that, even though the materials themselves are waterproof, some water may enter under the swimming cap through voids or crevices formed especially around the edge of the swimming cap, for example due to the hair of the athlete.

BRIEF DESCRIPTION OF THE DRAWINGS

In the following, exemplary embodiments of the invention are described with reference to the figures.

DETAILED DESCRIPTION OF PREFERRED EMBODIMENTS

In the following some embodiments of the invention are described in detail. It is to be understood that these exemplary embodiments can be modified in a number of ways and combined with each other whenever compatible and that certain features may be omitted in so far as they appear dispensable.

Figure 1A:
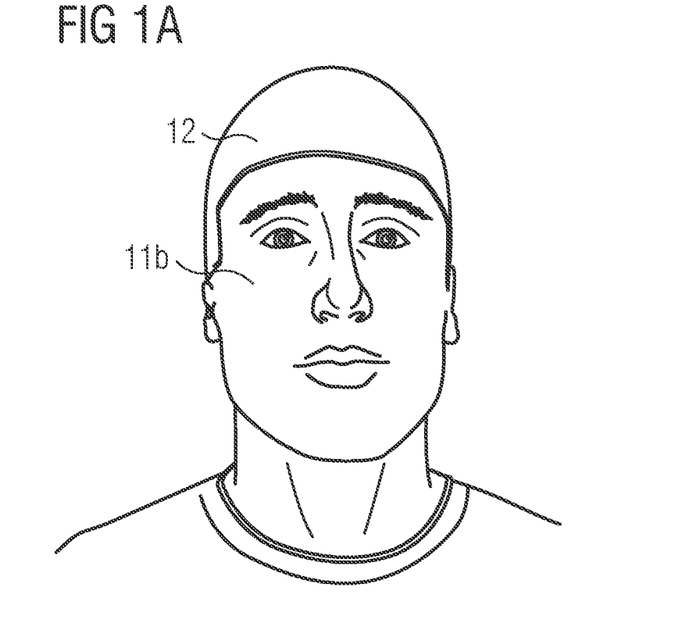
FIG. 1A: shows a front view of an exemplary digital model of a body part and an exemplary digital model of a sports article according to the present invention.
Figure 1B:
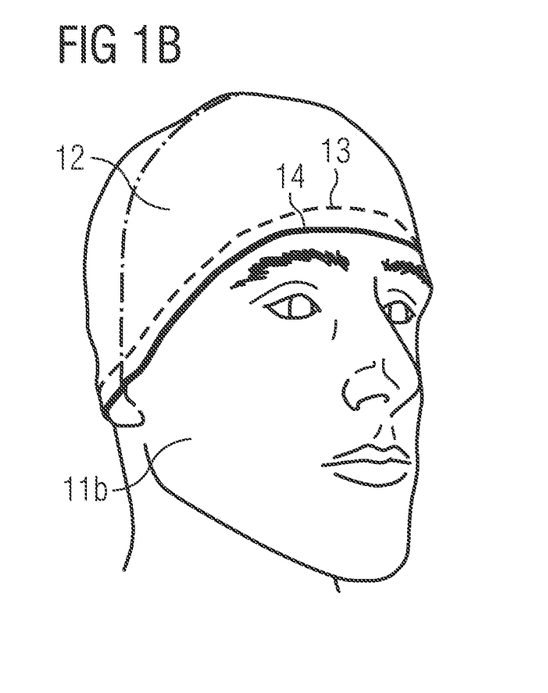
FIG. 1B: shows a lateral view of the exemplary digital model of a body part and the exemplary digital model of a sports article of FIG. 1A.
Figure 1C:
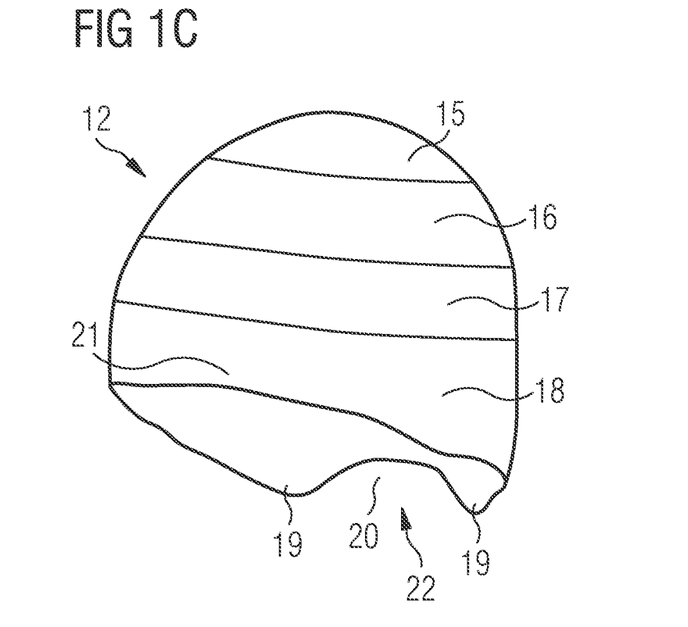
FIG. 1C: shows a perspective view of the exemplary digital model of a sports article of FIG. 1A.

FIGS. 1A-1C illustrate an exemplary method of designing a sports article according to embodiments of the present invention.

The exemplary method of designing a sports article comprises: (a1) scanning at least one body part of at least a first person; (a2) scanning the body part of a second person; (b1) creating a first digital model (not shown in FIGS. 1A-1C) of the body part of the first person; (b2) creating a second digital model (not shown in FIGS. 1A-1C) of the body part of the second person; (c) creating an average digital model of the body part 11b based on an average of the first digital model and the second digital model; (d) creating a digital model of the sports article 12; (e) digitally arranging the digital model of the sports article 12 on the average digital model of the body part 11b, allowing the digital model of the sports article 12 to stretch digitally; and (f) digitally modifying at least one property of the digital model of the sports article 12 based on the average digital model of the body part 11b and the digital model of the sports article 12.

FIG. 1A shows a front view of the exemplary average digital model of a body part 11b, in this example a head, and an exemplary digital model of a sports article 12, in this example a swimming cap. FIG. 1B shows a corresponding lateral view.

In this example, scanning at least one body part comprises providing at least two cameras to obtain a three-dimensional image of the body part. This way, the three-dimensional first digital model of the body part and the three-dimensional second digital model of the body part underlying the average digital model of the body part 11b shown in FIGS. 1A-1B were obtained.

The property, which is modified, comprises a shape of the swimming cap. In this example, an initial length 13 of the swimming cap in a front portion 21 is modified. The modified length 14 is longer than the initial length 13 as shown in FIG. 1B. The front portion 21 may be a portion of the swimming cap that is arranged on the forehead of an athlete during normal use.

Referring to FIG. 1C, the property of the digital model of the sports article 12 comprises a circumference of the swimming cap. Digitally modifying the circumference comprises: digitally modifying the circumference such that, when digitally arranging the digital model of the swimming cap 12 on the first digital model of the body part 11a or the average digital model of the body part 11b, the circumference of a first portion 15 of the digital model of the swimming cap 12 stretches by a first fraction and the circumference of a second portion 16 of the digital model of the swimming cap 12 stretches by a second fraction. It is to be understood that digitally modifying the circumference means, digitally modifying the unstretched circumference, i.e. digitally modifying is not the same as digitally stretching since in the latter case the circumference would increase but the unstretched circumference would not increase.

In this example, the digital model of the swimming cap 12 also comprises a third portion 17 and a fourth portion 18. The circumference of a third portion 17 of the swimming cap stretches by a third fraction and the circumference of a fourth portion 18 of the swimming cap stretches by a fourth fraction.

In this example, the first portion 15 is a top portion and the second portion 16 is an intermediate portion of the swimming cap, and the first fraction is smaller than the second fraction. The third portion 17 is a lower intermediate portion and the fourth portion 18 is a bottom portion of the swimming cap. The second fraction is smaller than the third fraction, which, in turn, is smaller than the fourth fraction. It is also possible that there are only a top portion and a bottom portion for a swimming cap. In this case, the first portion 15 and the second portion 16 can be the same as a top portion, and the third portion 17 and the fourth portion can be the same as a bottom portion. Alternatively, the top portion can include first to third portions 15-17.

As an example, the first fraction is 10%, the second fraction is 20%, the third fraction is 30% and the fourth fraction is 40%.

In this example, modifying the shape of the digital model of the swimming cap further comprises creating two overhang portions 19 arranged symmetrically on either side of a spine of a wearer and a recess 20 arranged in proximity to the spine. The overhang portions 19 protrude from a surrounding edge (omitted for clarity, shown in FIG. 2A) of the digital model of the swimming cap by 1.5 cm and the recess 20 represents an indentation from the surrounding edge by 3 cm.

In particular, in order to provide an optimal fit of the swimming cap for a group of swimmers, there is a need to understand the geometry of the swimmers' heads. This can be achieved by creating an average digital head model of the swimmers, which comprises scanning the head of multiple swimmers and performing a statistical analysis of the head scans. One exemplary way to perform this is by a non-rigid registration process, which digitally applies a common template mesh to all head scan instances and obtains a set of meshes corresponding to the multiple head scans. Each mesh of the set of meshes has the same topology and number of vertices but with various geometry and shape corresponding to the respective original scan. The set of meshes then allows to directly and easily compare the head scans and to perform statistical operations such as computation of averages or standard deviations. An average model of the multiple head scans can thus be generated. Alternatively, any suitable method for generating a 3D geometry may be used here.

Figure 2A:
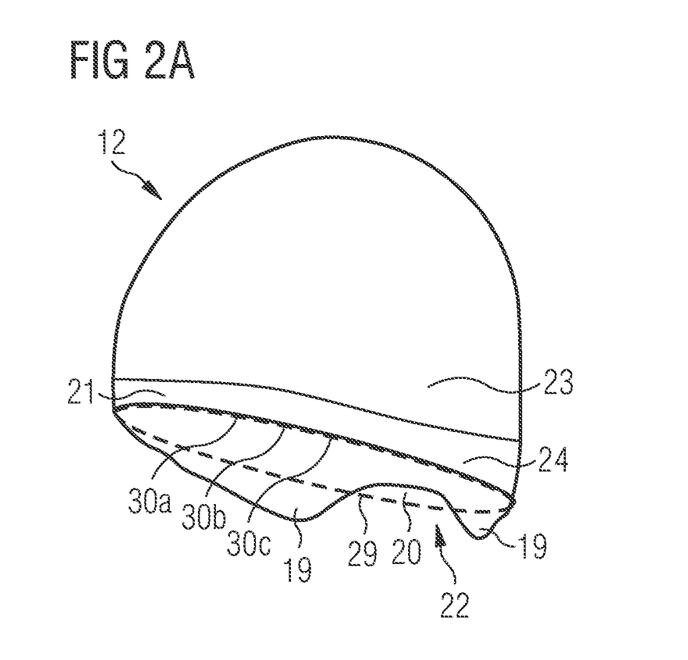
FIG. 2A: shows a perspective view of an exemplary digital model of a swimming cap according to the present invention.

FIGS. 2A-2D illustrate another aspect of embodiments of the present invention. FIG. 2A shows an exemplary digital model of a swimming cap.

The exemplary digital model of the swimming cap 12 comprises: a main body 23 comprising a first thickness; and a rim portion 24, arranged around a rim of the swimming cap, comprising a second thickness; and two overhang portions 19 arranged symmetrically on either side of a spine of a wearer and a recess 20 arranged in proximity to the spine.

The overhang portions 19 protrude from a surrounding edge 29 of the digital model of the swimming cap 12. The recess 20 is an analogous indentation from the surrounding edge 29 of the digital model of the swimming cap 12.

The surrounding edge 29 is an imaginary edge of the swimming cap defined by a forehead portion of the swimming cap and extended around the entire circumference of the digital model of the swimming cap 12. A geometrically-equivalent definition of an overhang portion and a recess can be made in respect of a plane defined by three distinct non-collinear points 30a-30c on an edge of the digital model of the swimming cap in a forehead portion of the digital model of the swimming cap 12. The plane defines a reference with respect to which the overhang portions protrude and with respect to which the recess represents an indentation.

The recess 20 is arranged in a rear portion 22 opposite of a front portion 21. The overhang portions 19 protrude from a surrounding edge 29 of the digital model of the swimming cap by 1.5 cm and the recess 20 represents an indentation from the surrounding edge 29 by 3 cm, as indicated by the dotted line.

In this example, the first thickness is smaller than the second thickness.

In this case, the digital model of the swimming cap 12 further comprises at least one material property of the swimming cap. The at least one material property comprises an elastic modulus of the swimming cap. The exemplary digital model of the swimming cap 12 is for a swimming cap made from silicone and therefore the elastic modulus is the elastic modulus of silicone. In this case the elastic modulus, also known as Young's modulus could be between 2-12 MPa.

Figure 2B:
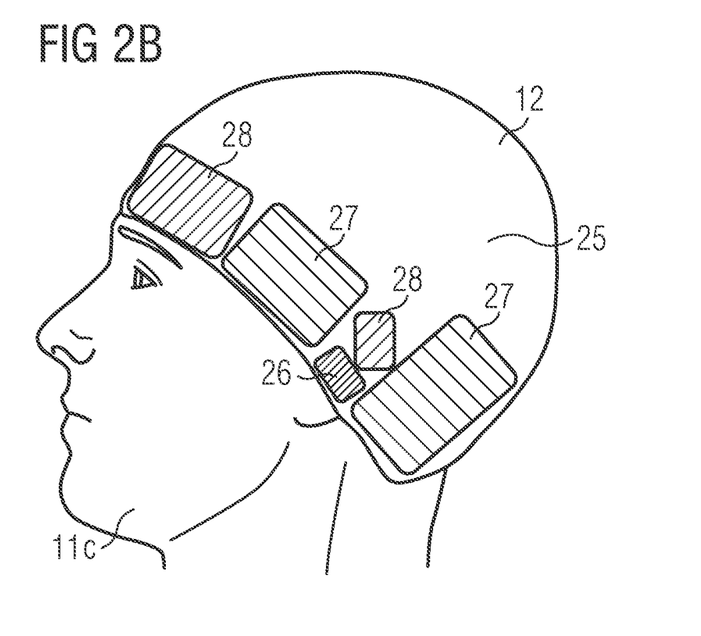
FIG. 2B: shows shear forces acting on the exemplary digital model of a swimming cap of FIG. 2A.
Figure 2C:
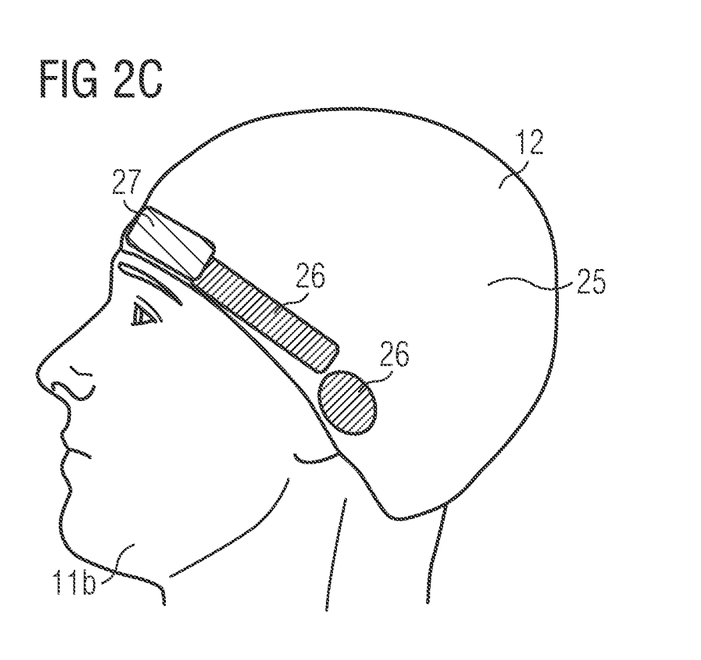
FIG. 2C: shows shear forces acting on the exemplary digital model of a swimming cap of FIG. 2A.
Figure 2D:
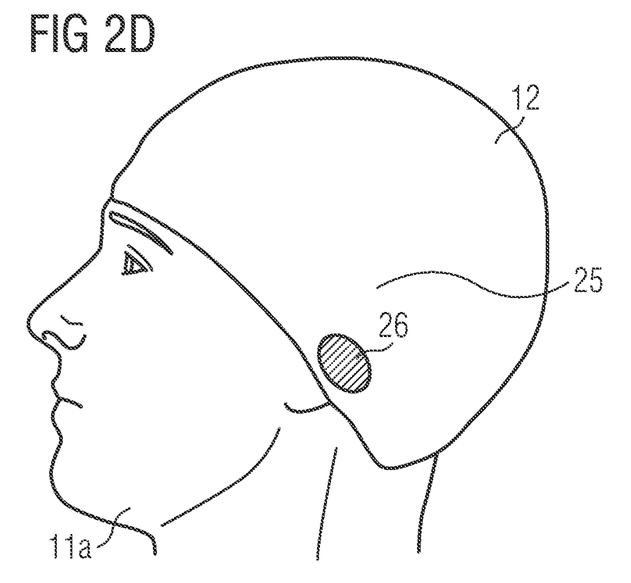
FIG. 2D: shows shear forces acting on the exemplary digital model of a swimming cap of FIG. 2A.

As illustrated in FIGS. 2B-2D, the method further comprises calculating at least one force on the basis of the first digital model of the body part 11a and the digital model of the sports article 12. Digitally modifying the property of the digital model of the sports article 12 is at least partially based on the calculated force. The force is a vertical shear force and in particular an upwards-pulling shear force, and digitally modifying the property of the digital model of the sports article 12 comprises reducing the upwards-pulling shear force. The force is calculated on the basis of a finite-element analysis.

FIGS. 2B-2D show the vertical shear force and in particular the upwards-pulling shear force calculated for three different digital models of the swimming cap using the same first digital model of the body part 11a, i.e. the head.

The digital model of the swimming cap shown in FIG. 2B has a main body (such as main body 23 shown in FIG. 2A) with a uniform thickness of 0.8 mm and a rim portion (such as rim portion 24 shown in FIG. 2A) with a thickness of 2 mm. FIG. 2B shows that a low-force region 26 is located just below the ear of the first digital model of the head, and medium-force regions 27 are located in proximity to the os temporale and the os occipitale. High-force regions 28 are located in proximity to the os frontale and over the ear. Reference numeral 25 indicates a "zero-force region" in which the calculated forces are below a predetermined threshold value.

The digital model of the swimming cap shown in FIG. 2B therefore overall leads to quite substantial vertical shear forces and in particular upwards-pulling shear forces that would act to pull the swimming cap off the head of an athlete and may lead to substantial discomfort for the athlete. It should be noted that a digital model of a swimming cap with a uniform thickness, i.e. a swimming cap without a rim portion 24, would display far greater vertical shear forces and in particular upwards-pulling shear forces.

The digital model of the swimming cap shown in FIG. 2C has a main body (such as main body 23 shown in FIG. 2A) with a uniform thickness of 0.6 mm and a rim portion (such as rim portion 24 shown in FIG. 2A) with a thickness of 2 mm. FIG. 2C shows that low-force region 26s are located just below the ear of the first digital model of the head and in proximity to the os temporale. A medium-force region 27 is located in proximity to the os frontale. Reference numeral 25 indicates a "zero-force region" in which the calculated forces are below a predetermined threshold value.

The digital model of the swimming cap shown in FIG. 2C therefore overall leads to significantly-reduced vertical shear forces and in particular upwards-pulling shear forces compared with the digital model of the swimming cap shown in FIG. 2B.

The digital model of the swimming cap shown in FIG. 2D has a main body (such as main body 23 shown in FIG. 2A) with a uniform thickness of 0.4 mm and a rim portion (such as rim portion 24 shown in FIG. 2A) with a thickness of 2 mm. FIG. 2D shows that a low-force region 26 is located just below the ear of the first digital model of the head 11a. Reference numeral 25 indicates a "zero-force region" in which the calculated forces are below a predetermined threshold value.

The digital model of the swimming cap shown in FIG. 2D therefore overall leads to almost no vertical shear forces and in particular almost no upwards-pulling shear forces, therefore leading to an excellent and stable fit and a comfortable wearing experience.

Figure 3A:
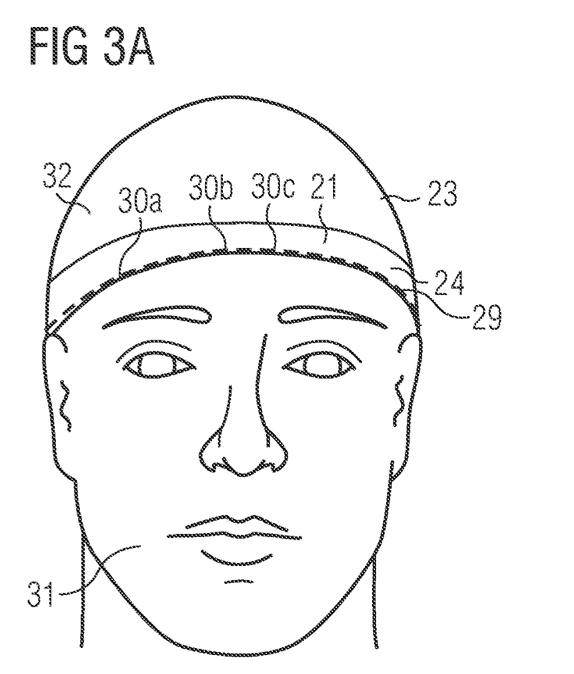
FIG. 3A: shows a front view of an exemplary swimming cap according to the present invention.
Figure 3B:
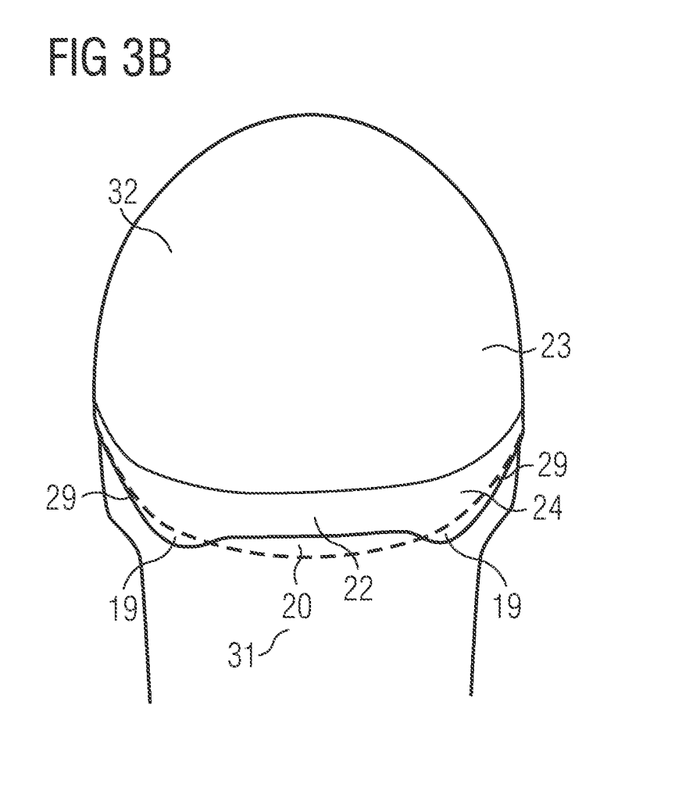
FIG. 3B: shows a rear view of the exemplary swimming cap of FIG. 3A.

FIGS. 3A-3B show an exemplary swimming cap 32 according to embodiments of the present invention. The swimming cap 32 is arranged on a dummy 31, which is a physical model of an average digital model of a head 11b as described herein, for example with reference to FIGS. 1A-1C. FIG. 3A shows a front view, while FIG. 3B shows a rear view.

The swimming cap 32 comprises: a main body 23 comprising a first thickness; and a rim portion 24, arranged around a rim of the swimming cap 32, comprising a second thickness; and two overhang portions 19 arranged symmetrically on either side of a spine of a wearer and a recess 20 arranged in proximity to the spine.

The overhang portions 19 protrude from a surrounding edge 29 of the swimming cap 32. The recess 20 is an analogous indentation from the surrounding edge 29 of the swimming cap 32.

The surrounding edge 29 is an imaginary edge of the swimming cap defined by a forehead portion of the swimming cap and extended around the entire circumference of the digital model of the swimming cap 12. A geometrically-equivalent definition of an overhang portion and a recess can be made in respect of a plane defined by three distinct non-collinear points 30a-30c on an edge of the swimming cap 32 in a forehead portion of the swimming cap 32. The plane defines a reference with respect to which the overhang portions 19 protrude and with respect to which the recess 20 represents an indentation.

In this example, the first thickness is smaller than the second thickness.

The first thickness is 0.4 mm and the second thickness is 2 mm. The main body 23 comprises a first material and the rim portion 24 also comprises the first material. In this case, the main body 23 and the rim portion 24 are made from silicone using slush molding.

A width of the rim portion 24 varies around the rim between 10 mm and 30 mm. The inventors have found that the variation in the width of the rim portion 24 may further improve the balance between good fit and low drag. In this example, the rim portion 24 has a smaller width in a front portion 21 than in a rear portion 22.

The main body 23 and the rim portion 24 comprise a shore A hardness of 40. Although in this example the surface of the main body 23 and/or the rim portion 24 does not comprise a texture, in other examples the surface of the main body 23 and/or the rim portion 24 may comprise a texture.

The overhang portions 19 protrude from a surrounding edge 29 of the swimming cap 32 by 1 cm and the recess 20 represents an indentation from the surrounding edge 29 by 1 cm.

REFERENCE NUMERALS

11a: first digital model of the body part
11b: average digital model of the body part
12: digital model of the sports article
13: initial length
14: modified length
15: first portion
16: second portion
17: third portion
18: fourth portion
19: overhang portion
20: recess
21: front portion
22: rear portion
23: main body
24: rim portion
25: zero-force region
26: low-force region
27: medium-force region
28: high-force region
29: surrounding edge
30a,30b,30c: point
31: dummy
32: swimming cap

What is claimed is:

1. A swimming cap comprising:
   a main body comprising a first thickness between 0.3 and 0.5 mm;
   a rim portion, arranged around a rim of the swimming cap, comprising a second thickness greater than the first thickness; and
   two overhang portions configured to be arranged symmetrically on either side of a spine of a wearer and a recess configured to be arranged in proximity to the spine.

2. The swimming cap according to claim 1, wherein the second thickness is between 1.5 and 2.5 mm.

3. The swimming cap according to claim 1, wherein the main body comprises a first material and the rim portion also comprises the first material.

4. The swimming cap according to claim 1, wherein a width of the rim portion as measured along an exterior surface of the swimming cap from the rim toward a top of the swimming cap varies around the rim between 10 mm and 30 mm.

5. The swimming cap according to claim 1, wherein the main body comprises a shore A hardness of between 20 and 50.

6. The swimming cap according to claim 1, wherein the two overhang portions protrude from a surrounding edge of the swimming cap by at least 1 cm and the recess represents an indentation from the surrounding edge by at least 1 cm.

7. The swimming cap according to claim 1, wherein a width of the rim portion as measured along an exterior surface of the swimming cap from the rim toward a top of the swimming cap varies around the rim.

8. The swimming cap according to claim 7, wherein the width of the rim portion in a front portion of the swimming cap is less than the width of the rim portion in a rear portion of the swimming cap.

9. A swimming cap comprising:
a main body comprising a first thickness;
a rim portion, arranged around a rim of the swimming cap and extending from the rim toward a top of the swimming cap, comprising a second thickness; and
two overhang portions configured to be arranged symmetrically on either side of a spine of a wearer and a recess configured to be arranged in proximity to the spine;
wherein a width of the rim portion as measured along an exterior surface of the swimming cap from the rim toward the top of the swimming cap varies around the rim between 10 mm and 30 mm.

10. The swimming cap according to claim 9, wherein the first thickness is smaller than the second thickness.

11. The swimming cap according to claim 9, wherein the first thickness is between 0.2 and 0.6 mm.

12. The swimming cap according to claim 9, wherein the second thickness is between 1.5 and 2.5 mm.

13. The swimming cap according to claim 9, wherein the main body comprises a first material and the rim portion also comprises the first material.

14. The swimming cap according to claim 9, wherein the width of the rim portion in a front portion of the swimming cap is less than the width of the rim portion in a rear portion of the swimming cap.

15. The swimming cap according to claim 9, wherein the main body and/or the rim portion comprises a shore A hardness of between 20 and 60.

16. The swimming cap according to claim 9, wherein the two overhang portions protrude from a surrounding edge of the swimming cap by at least 1 cm and the recess represents an indentation from the surrounding edge by at least 1 cm.

17. A swimming cap comprising:
a main body comprising a first thickness between 0.2 and 0.6 mm and a shore A hardness of between 20 and 50;
a rim portion, arranged around a rim of the swimming cap, comprising a second thickness, wherein the rim portion is defined by an increase in thickness with respect to the main body; and
two overhang portions configured to be arranged symmetrically on either side of a spine of a wearer and a recess configured to be arranged in proximity to the spine.

* * * * *